United States Patent [19]

Oberheide et al.

[11] 4,062,221
[45] Dec. 13, 1977

[54] HAND-PORTABLE SHOCK ABSORBER TESTER

[75] Inventors: Christian H. Oberheide, Arlington Heights; Edward Mikkelsen; George E. Misthos, both of Glenview, all of Ill.

[73] Assignee: Promotional Marketing Incorporated, Glenview, Ill.

[21] Appl. No.: 751,545

[22] Filed: Dec. 16, 1976

[51] Int. Cl.$^2$ .......................................... G01M 17/04
[52] U.S. Cl. ........................................................ 73/11
[58] Field of Search .................................... 73/11, 71.2

[56] References Cited

U.S. PATENT DOCUMENTS

| | | | |
|---|---|---|---|
| 3,164,003 | 1/1965 | MacMillan | 73/11 |
| 3,456,489 | 7/1969 | Levenson | 73/11 |
| 3,526,887 | 9/1970 | Erni | 340/324 R |
| 3,806,911 | 4/1974 | Pripusich | 340/325 |
| 3,830,093 | 8/1974 | Emerson | 73/11 |
| 3,857,275 | 12/1974 | Youngs | 73/11 |

FOREIGN PATENT DOCUMENTS 708,388  6/1941  Germany ............................... 73/71.2

Primary Examiner—Richard C. Queisser
Assistant Examiner—Anthony V. Ciarlante
Attorney, Agent, or Firm—Dominik, Knechtel, Godula & Demeur

[57] ABSTRACT

A method and apparatus for testing shock absorbers in situ on automotive vehicles, the apparatus including, generally, a light-weight, hand-carried console which in the preferred embodiment includes its own source of energy so that it is truly portable, and which also has an oscillation detector in the form of an accelerometer supported thereon. The console of the apparatus is preferably placed on the fender of the vehicle, directly over the tire or wheel to which the shock absorber to be tested is coupled. The console has thereon easily observable light indicators to visually indicate the number of times the vehicle oscillates up and down. Initially, the vehicle is bounced a pre-determined number of times to activate the apparatus, five times in the disclosed embodiment, with each bounce, that is, each up and down, being visually indicated by means of operating lights. An alarm or warning also is provided to audibly indicate that the vehicle has been bounced the proper amount of times and should be released. The subsequent oscillations, each up and down, thereafter are counted and visually indicated by the indicator lights to provide a visual record of the number of oscillations made by the vehicle after it was released.

The number of oscillations so made by the vehicle are an indication of the relative condition of the shock absorber. Generally, three or less oscillations indicate a good shock absorber, while four oscillations may suggest a marginal condition. Five or more oscillations would indicate an unsatisfactory shock absorber, as specified by the Department of Transportation.

15 Claims, 4 Drawing Figures

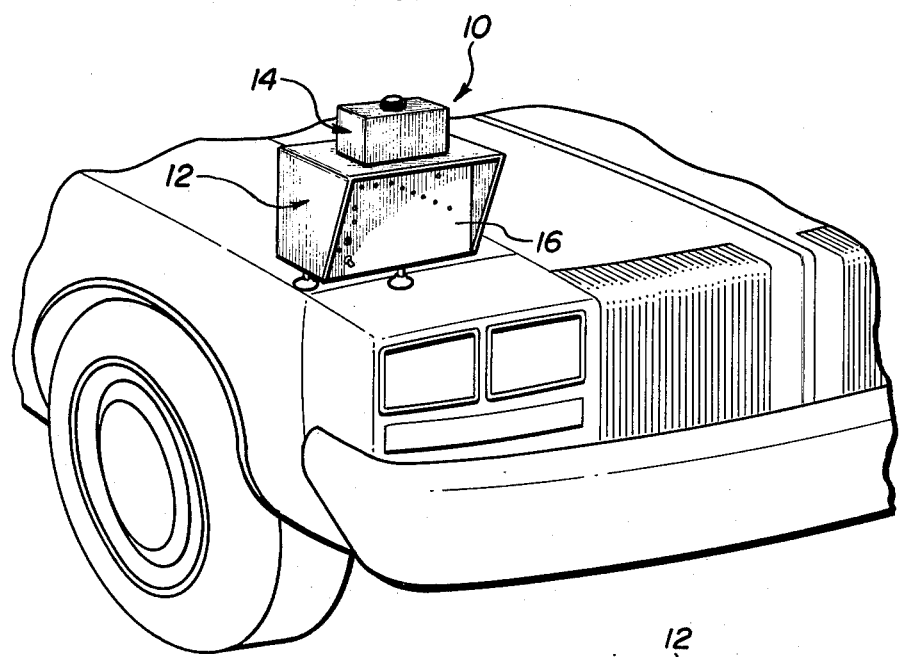
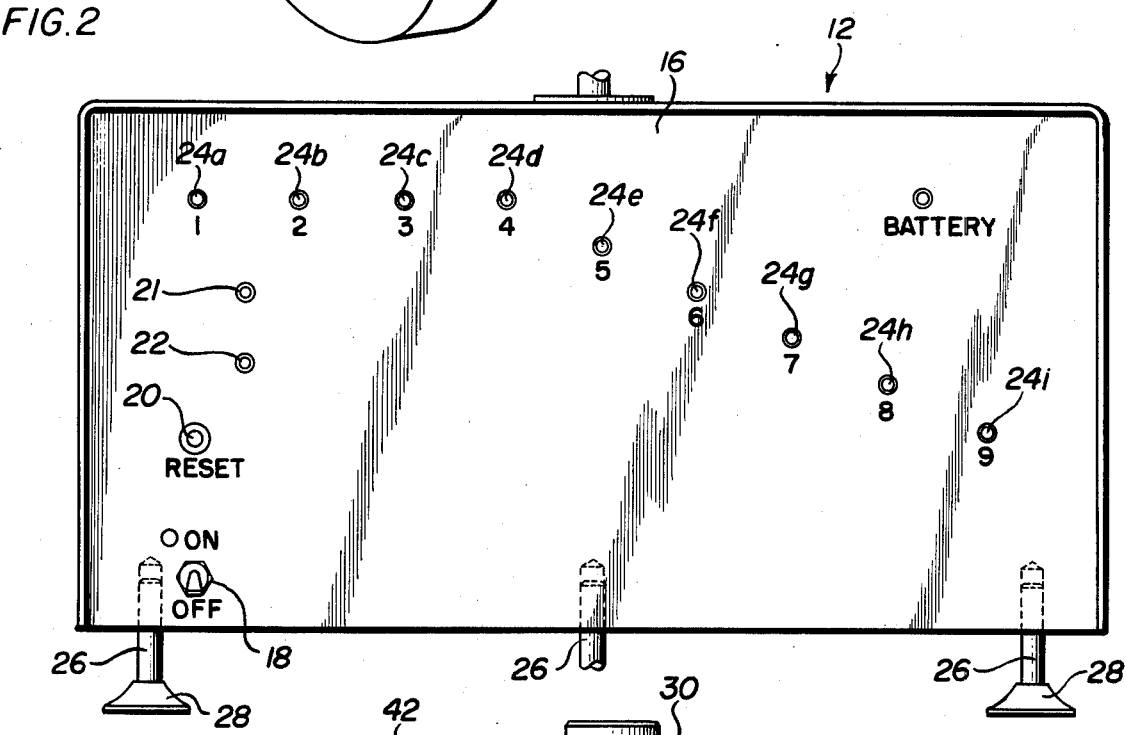
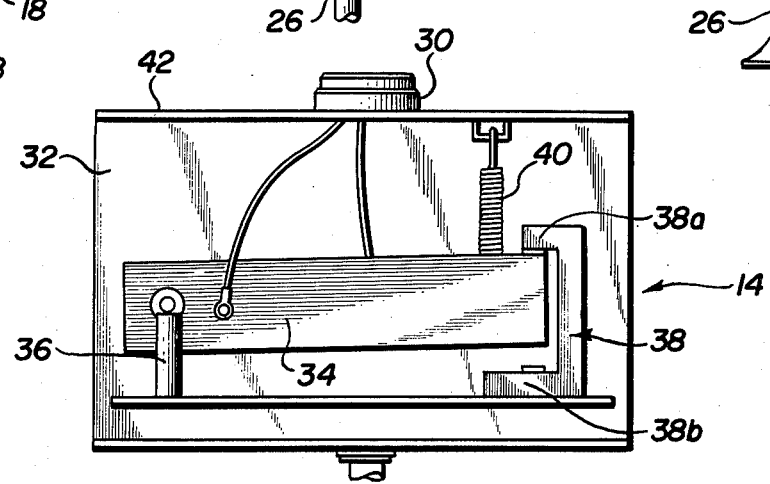

HAND-PORTABLE SHOCK ABSORBER TESTER

BACKGROUND OF THE INVENTION

This invention relates to an improved method and apparatus for testing and indicating the condition of shock absorbers in situ on automotive vehicles, particularly automobiles. More particularly, the invention relates to apparatus of the described type which is portable and which carries its own source of energy for operating it.

In the past, various different methods and apparatus have been proposed for testing shock absorbers in situ on automotive vehicles, however, most, if not all, of them have not been commercially acceptable for one reason or another. One such apparatus is disclosed in U.S. Pat. No. 3,164,003, issued to C. W. MacMillan on Jan. 5, 1965. The disclosed shock absorber tester comprises a jack-type apparatus for lifting the car body and then dropping it to set it into oscillation, and sensing means for measuring the number and amplitude of the oscillations to obtain an indication of shock absorber condition. While the MacMillan device provides an accurate initial displacement, it comprises a very heavy and bulky apparatus. It is certainly not portable in the sense that it can be transported and, particularly, it cannot be hand-carried from place to place. Furthermore, the MacMillan device does not provide a record of the number of oscillations. The operator must not take his eyes off the indicator pointer and must remember the number and amplitude of its swings.

A similar apparatus is disclosed in U.S. Pat. No. 3,456,489, issued to S. J. Levenson, on July 22, 1969. Levenson uses an accelerometer-type sensor which is placed upon the hood of an automobile and is connected to an indicator panel which serves to analyze the number and magnitude of the oscillations. Levenson's apparatus, like MacMillan's, certainly is not portable. Also, he does not disclose the details of the sensor, analyzer or indicator panel, hence it is not clear exactly what quantity is being measured.

In U.S. Pat. No. 3,313,142, issued to B. C. Lackman, on Apr. 11, 1967, it is illustrated in FIGS. 10 through 13 a testing apparatus adapted to be placed upon an automotive fender or hood. The car is then driven over a ramp of predetermined size in order to place the sprung portion of the automobile body into vertical oscillations from a predetermined displacement, the oscillations being measured by a sensor to produce an output indication at the total time that the car is in motion in a given vertical direction. The accuracy of this particular apparatus is questionable, since the automobile must be driven or otherwise moved in a forward direction over a ramp during the testing procedure in order to perform the test.

Other similar apparatus for testing shock absorbers in situ on automotive vehicles are disclosed in U.S. Pat. Nos. 3,157,044; 3,383,909; 3,857,276; 3,902,352; 3,906,779 and 3,939,692. The apparatus disclosed in each of these patents generally suffer from the same disadvantages found with the apparatus disclosed in the above-mentioned patents to MacMillan, Levenson and Lackman.

SUMMARY OF THE INVENTION

In contrast to the apparatus disclosed in the above-mentioned patents, the apparatus of the present invention includes, generally, a light-weight, hand-carried console which in the preferred embodiment includes its own source of energy so that it is truly portable, and which also has an oscillation detector in the form of an accelerometer supported thereon. The operation of the apparatus is specifically designed to test shock absorbers in accordance with the performance standards adopted by the Department of Transportation (Federal Register, Volume 38, Number 171, Sept. 5, 1973, page 23951). In particular, the Department of Transportation specifies that a party should push down on one end of the vehicle and release it. The vehicle should not continue free-rocking motion for more than four oscillations after it is released.

Accordingly, the console of the apparatus of the present invention is preferably placed on the fender of the vehicle, directly over the tire or wheel to which the shock absorber to be tested is coupled. The console has thereon easily observable light indicators to visually indicate the number of times the vehicle oscillates up and down. Initially, the vehicle is bounced a pre-determined number of times to activate the apparaus, five times in the disclosed embodiment, with each bounce, that is, each up and down, being visually indicated by means of operating lights. An alarm or warning also is provided to audibly indicate that the vehicle has been bounced the proper amount of times and should be released. The subsequent oscillations, each up and down, thereafter are counted and visually indicated by the indicator lights to provide a visual record of the number of oscillations made by the vehicle after it was released.

The number of oscillations so made by the vehicle are an indication of the relative condition of the shock absorber. Generally, three or less oscillations indicate a good shock absorber, while four oscillations may suggest a marginal condition. Five or more oscillations would indicate an unsatisfactory shock absorber, as specified by the Department of Transportation.

Accordingly, it is an object of the present invention to provide an improved method and apparatus for testing and indicating the condition of shock absorbers in situ on automotive vehicles, particularly automobiles.

More particularly still, it is an object to provide apparatus of the above type which is portable and which carries its own souce of energy for operating it.

These and other objects, features and advantages of the present invention will be apparent from the following detailed description, taken in conjunction with the following drawings.

DESCRIPTION OF THE DRAWINGS

FIG. 1 is a partial perspective view of a vehicle, illustrating the placement of a shock absorber tester exemplary of the present invention thereon;

FIG. 2 is a partial front plan view of the shock absorber tester;

FIG. 3 is a front plan view of the oscillation detector with its front cover removed.

Similar reference characters refer to similar parts throughout the several views of the drawings.

DESCRIPTION OF A PREFERRED EMBODIMENT

Figure 4:
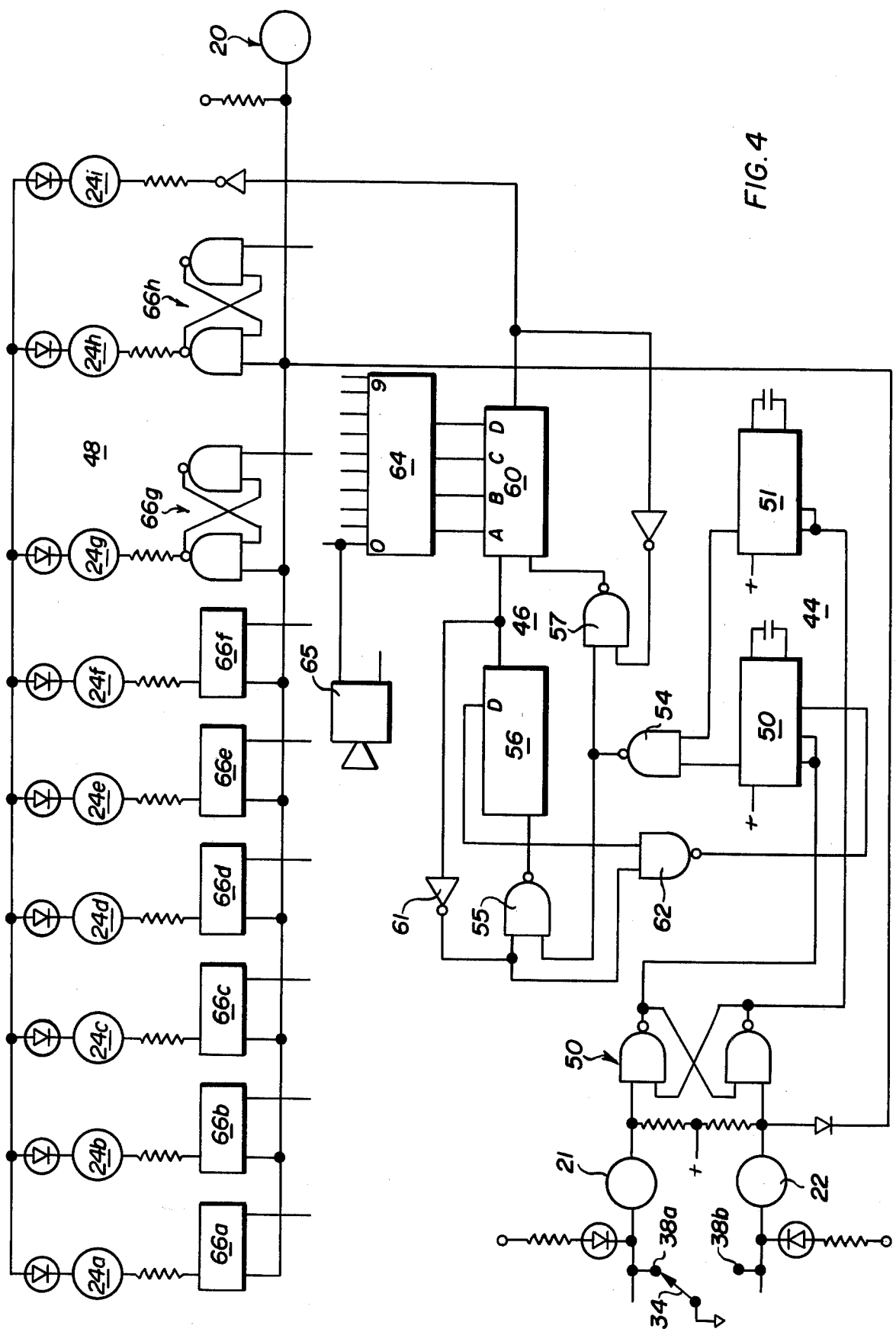
FIG. 4 is a block diagram schematic of the electrical circuitry of the shock absorber tester.

Referring now to the drawings, in FIG. 1 there is illustrated a shock absorber tester 10 constructed in accordance with a preferred embodiment of the invention, including a display console 12 having an oscillation detector 14 supported on the top thereof. The display console 12 functions as a housing for containing the source of power for the tester 10 and its electrical or electronic circuitry, all as more fully described below. The oscillation detector 14 is an accelerometer which is operable to detect the oscillations of a vehicle, and to provide output electrical pulses to the electronic circuitry to operate the latter to provide a visual record of the number of oscillations made by the vehicle after an initial displacement that activates the tester 10, to thereby provide an indication of the condition of a shocker absorber under test.

More particularly, the display console 12 is a generally rectangular-shaped housing which may be of a suitable material, preferably sheet metal, and having a front panel 16 that functions as a display panel and has mounted thereon an ON/OFF switch 18, a re-set button 20, a pair of operating lights 21 and 22 and a number of indicator lights 24 (9 in the illustrated embodiment and referenced as the indicator lights 24a–24i). A number of legs 26 (three in the illustrated embodiment) are provided on the base of the display console 12. These legs 26 are mounted in a suitable fashion to permit the tester 10 to be seated and leveled on a vehicle, and further preferably and advantageously have magnetic or suction feet 28 on the terminal ends thereof for removably securing the tester 10 on the vehicle in a relatively fixed fashion.

The oscillation detector or accelerometer 14 is pivotally mounted on top of the display console 12, and has level indicating means such as the bulb level 30 affixed to it so that it may be leveled once it is seated on a vehicle. The oscillation detector 14 can be any one of a number of different types of accelerometers commercially available on the market, the only requirement being that it produces an output electrical pulse during each up and down movement of the vehicle. While any one of these accelerometers may be used, many of them are far more complex and correspondingly expensive for this application, hence a relatively simple and inexpensive accelerometer was designed and used.

The oscillation detector or accelerometer 14, in accordance with the invention, comprises a housing 32, an actuator 34 in the form of a length of bar steel of a generally rectangular shape which is pivotally secured by means of a bracket 36 within the housing 32, a generally C-shaped contact member 38 secured in operative relationship with the actuator 34 to provide electrical output pulses, as more fully described below, and a spring member 40 which normally functions to support or maintain the free end of the actuator 34 in a relaxed position between and without engagement with either of the two contacts 38a and 38b of the contact member 38. In this respect, the ends of the spring member 40 are affixed to the free end of the actuator 34 and to the top wall 42 of the housing 32. The spring member 40 should be sufficiently stiff to support the actuator 34 in this fashion, and to dampen the movement of the actuator 34 after the vehicle ceases to oscillate.

Referring now to FIG. 4, the actuator 34 and the contacts 38a and 38b of the contact member 38 are shown schematically in conjunction with the electronic circuitry of the display console 12. Generally, the electronic circuitry includes a pulse generating means 44, counter means 46 and display means 48.

The pulse generating means 44 includes a flip-flop circuit 50 which is operated to provide an output pulse each time the free end of the actuator 34 engages or contacts the respective ones of the contacts 38a and 38b of the contact member 38. It may also be noted that each time the contacts 38a and 38b are engaged by the free end of the actuator 34 that the respective ones of the operating lights 21 and 22 on the front display panel of the display console 12 are energized to provide an indication that the oscillation detector or accelerometer 14 is operating.

The outputs of the flip-flop circuit 50 are coupled respectively to the input of one of a pair of multivibrators 51 and 52, each of which may be a type 74121 monostable multivibrator. Each time an output pulse is generatd by the flip-flop circuit 50, one of the two multivibrators 51 and 52 is triggered to provide an output pulse.

The output pulses from the multivibrators 51 and 52 are coupled through a NAND gate 54, the output of which is, in turn, coupled to a NAND gate 55 and a NAND gate 57. These NAND gates 54, 55 and 57 all may be type 7400 2-input NAND gates. In operation, the NAND gate 54 is gated to provide an output pulse to the NAND gates 55 and 57 each time one or the other, or both, of the outputs of the multivibrators 51 and 52 is low. Accordingly, each time the actuator 34 operates the flip-flop circuit 50, an output pulse is gated to and through the NAND gate 54, from one or the other of the multivibrators 51 and 52.

The counter means 46 generally includes a pair of decade counters 56 and 60, both of which may be type 74160 counters, a BCD converter 64 which may be a type 7442 BCD to decimal decoder, and the NAND gates 55 and 57, which may be type 7400 2-input NAND gates. Normally, the one input of the NAND gate 55 is low, so that the pulses gated through the NAND gate 54 are coupled through to the decade counter 56, which operates to count each of these pulses. When eight pulses have been counted, the D output of the decade counter 56 goes high. This D output is coupled to one input of a NAND gate 62 which may be a type 7400 2-input NAND gate. The NAND gate 62, at this time, functions to inhibit the operation of the multivibrator 51, for reasons described more fully below.

The next pulse provided by the flip-flop 50 triggers one of the two multivibrators 51 and 52. The multivibrator 51 is inhibited at this time so that it does not provide an output pulse, in the event the count of the decade counter 56 is not in synchronism with the desired up and down motion of the vehicle under test. If the vehicle is going down, normally the multivibrator 51 is triggered and its output pulse is counted. However, since it now is inhibited, no output pulse is provided to the NAND gate 54 and hence the latter is not gated to provide a pulse to the NAND gate 55 to be counted by the decade counter 56. Now, when the motion of the vehicle is up, the multivibrator 52 is triggered and its output pulse is gated through the NAND gates 54 and 55 to the decade counter 56. This is now the ninth pulse coupled to the decade counter 56, and its carry output goes high and is coupled to the enable input of the decade counter 60. This high on the carry output also is coupled through an inverter 61 which inverts it to a low, and this low is coupled to the NAND gate 55 and to the NAND gate 62. This low on the input to the NAND gate 55 inhibits the decade counter 56, to prevent it from further counting. The D output of the decade counter 56 also goes low when its carry output goes high, thus removing the inhibit on the multivibrator 51.

As the motion of the vehicle changes and now goes down, the multivibrator 51 again is triggered and its output pulse is gated through the NAND gate 54 to the NAND gates 55 and 57. Since the one input of the NAND gate 55 is low, this pulse is not gated through it to the decade counter 56. However, it is gated through the NAND gate 57 to the decade counter 60 which counts it. Upon being counted, the A output of the decade counter 60 goes high. The decoder 64 decodes this high and its "1" output goes low to, in turn, accomplish two functions, the first being to energize the buzzer 65 to alert the operator that the tester 10 has been properly activated and that he should cease inducing any oscillating motion to the vehicle. Secondly, the latch 66a is set so that the indicator light 24a is energized to visually indicate a first oscillation of the vehicle.

Now, if at the time the multivibrator 51 was inhibited, the motion of the vehicle was in the upward direction, the multivibrator 52 would have been triggered and an output pulse would have been provided and counted by the decade counter 56, even though the multivibrator 51 was inhibited. Upon counting this output pulse, the subsequent operations would be as described above. Accordingly, inhibiting the multivibrator 51 in this fashion on counting eight pulses, assures that the vehicle is oscillating in a downward direction when the buzzer 65 is energized and the indicator light 24a is energized.

Each subsequent pulse generated by the flip-flop 50 as a result of the oscillating motion of the vehicle operating the actuator 34 is coupled to and counted by the decade counter 60. Its outputs on its A, B, C and D outputs are decoded by the decoder 64, to progressively set the respective ones of the latches 66b, 66c, etc., to, in turn energize the respective ones of the indicator lights 24b, 24c, etc. Each indicator light 24 which is energized indicates one oscillation of the vehicle, either up or down.

When the decade counter 60 reaches its full count and its carry output goes high, the indicator light 24a is energized. All of the indicator lights remain energized, until the reset button 20 is operated to reset the electronic circuitry. Therefore, a visual indication of the number of oscillations made by the vehicle after the tester 10 is initially activated by the induced ocillatory motion is provided until the reset button 20 is operated.

Now that the operation of the shock absorber tester 10 has been described, its method of use in testing the condition of shock absorbers on a vehicle can be described. Initially, the shock absorber tester 10 is placed on the vehicle, preferably on the fender thereof and directly over the tire associated with the shock absorber to be tested. The shock absorber tester 10 and, particularly, the oscillation detector 14, is leveled by observing the bulb level 30.

The tester 10 then is energized by operating the ON/OFF switch 18. At this time, both of the operating lights 21 and 22 should be off. If either light is on or flickering, the tester should be properly leveled and the reset button 20 operated to reset the electronic circuitry.

Now the vehicle is bounced by pushing down on its fender or bumper, near the headlight. Each bounce, especially the fifth (last), should be approximately 4 inches or more from its initial position, and should be quick and solid to activate the tester 10. The vehicle should be pushed down in this fashion five times, and then released.

Each up and down motion of the vehicle is counted, as described above, and on the fifth bounce the buzzer 65 is energized to alert the operator that the tester 10 has been properly activated and that he should cease bouncing the vehicle. As each up and down motion is counted, the operating lights 21 and 22 will alternately flash to indicate that the oscillation detector 14 is operating. Also, each up and down oscillation, upon being counted, will be indicated by means of the indicator lights 24a–24i, until the vehicle comes to rest.

As specified by the Department of Transportation, the vehicle should not continue a free-rocking motion for more than four oscillations. Accordingly, a party can determine the condition of the shock absorber under test by observing the indicator lights 24 when the vehicle comes to rest. If no more than three indicator lights 24 are lighted indicating no more than three oscillations of the vehicle occurred, the shock absorber is good. if four of the indicator lights 24 are lighted, the condition of shock absorber may be marginal. If five or more indicator lights 24 are lighted, the shock absorber is unsatisfactory.

As indicated above, the shock absorber tester 10 includes its own source of power for operating it. The source of power, in this case, comprises a rechargeable 12v DC battery. Also, a voltage level detector is provided and is operable to light a battery charge light 25 on the front display panel, when the voltage level drops to approximately 4.8 volts. A plug-in jack (not shown) is provided on the rear panel of the display console 10, for a battery charger so that the battery can be recharged without the necessity of removing it from the display console.

It can be seen from the above description that a light weight, portable, self-contained shock absorber tester 10 is provided that can be used to test shock absorbers in situ on automotive vehicles. The operation and method of using the shock absorber tester is in accordance with the recommendations of the Department of Transportation so that the shock absorbers on a vehicle can be easily and readily tested to determine whether they function as specified, or are unsatisfactory. While a specific and preferred embodiment is illustrated and described, it is apparent that various changes in its construction and operation can be made. For example, while it is preferred to affix the oscillation detector 14 atop of the display console 12, the oscillation detector 14 obviously can be a detached unit coupled by means of electrical conductors to the display console 12. Also, an oscillation detector 14 of a specific construction is disclosed, but any one of a number of commercially available accelerometers could be used if desired. It is only necessary that the oscillation detector or accelerometer provide an output electrical pulse, on each up and down oscillatory motion of the vehicle. Further still, while specific electronic circuitry is disclosed, again other types of circuitry and/or apparatus can be used. It is only necessary to provide means to count the electrical pulses from the oscillation detector and to energize the indicating lights 24, in the manner generally described above.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

What is claimed is:

1. A hand-portable shock absorber tester for testing shock absorbers in situ on a parked automotive vehicle by detecting vertical movements of a sprung portion of the vehicle with respect to an unsprung portion thereof following an initial disturbing displacement of the sprung portion, said tester comprising an oscillation detector adapted to be removably mounted on the sprung portion of the vehicle and responsive to vertical oscillations thereof with respect to the unsprung portion for producing an output signal for each up or down movement of the strung portion; a display console coupled with said oscillation detector comprising counting means responsive to the output signals from said oscillation detector for counting same and producing a separate output indication for each output signal, and indicator means operated responsive to said output indications to provide a visual indication of the number of oscillations required for the sprung portion of the vehicle to return substantially to rest from the initial disturbing displacement thereof for indicating the condition of the shock absorber, said indicator means comprising a plurality of lights on a front display panel of said display console, the respective ones of said plurality of lights being consecutively energized responsive to said output indications and remaining energized until subsequently extinguished, thereby providing a semi-permanent visual indication of the number of said oscillations.

2. The shock absorber tester of claim 1, wherein said oscillation detector is fixedly secured to said display console.

3. The shock absorber tester of claim 1, wherein said counting means comprises first and second counting means, said first counting means being responsive to the output signals from said oscillation detector for counting same, said first counting means upon obtaining a predetermined count activating said second counting means, whereby said second counting means is only activated after the sprung portion of the vehicle has been manually oscillated an established predetermined number of times, said second counting means upon being activated, counting said output signals from said oscillation detector and producing said separate output indications to said indicator means.

4. The shock absorber tester of claim 3, further comprising audible warning means coupled to and activated by said second counting means when the latter is activated for providing an audible indication that the sprung portion of the vehicle has been manually oscillated the established predetermined number of times.

5. The shock absorber tester of claim 4, further comprising at least a pair of operating lights energized by said oscillation detector, said pair of operating lights being respectively energized for each up and down movement of the sprung portion of said vehicle to thereby provide a visual indication of the operation of said oscillation detector in producing said output signals for each up and down movement of the sprung portion of said vehicle.

6. The shock absorber tester of claim 5, further comprising a DC source of power for energizing said tester, said DC source of power being contained within said display console, whereby said tester can be readily transported and utilized without the necessity of any external power requirement.

7. The shock absorber tester of claim 6, wherein said output signals from said oscillation detector are electrical signals, said counting means including electronic means for counting said electrical output signals and for producing electrically-powered output indications.

8. The shock absorber tester of claim 3 wherein said first counting means comprises a first electronic counter coupled to said oscillation detector for counting the output signals therefrom and generating an output signal upon obtaining a predetermined count, said second counting means comprising a second electronic counter coupled to said first electronic counter and activated by the output signal generated by said first electronic counter to count the output signals from said oscillation detector and an electronic converting means coupled to said second electronic counting means and responsive to the output signals therefrom for converting same to decimal output signals, said indicator means comprising a plurality of lights equal in number to and respectively coupled to said electronic converting means and each being energized responsive to the respective ones of said decimal output signals to produce a positive and sustained indication, to thereby provide an indication of the number of oscillations required for the sprung portion of the vehicle to return substantially to rest from the initial disturbing displacement thereof for indicating the condition of the shock absorber.

9. The shock absorber tester of claim 1, wherein said counting means comprises an input coupled to said oscillation detector and a plurality of outputs corresponding respectively to decimal digits and being responsive to the output signals from said oscillation detector for counting same and producing a count signal at a corresponding one of said outputs for each output signal, and said indicator means comprises a plurality of lights equal in number to and respectively coupled to said counting means outputs and each being energized responsive to count signals at the corresponding output for producing a positive and sustained indication, thereby to indicate the number of oscillations required for the sprung portion of the vehicle to return substantially to rest from the initial disturbing displacement thereof for indicating the condition of the shock absorber.

10. The shock absorber tester of claim 9, wherein said counting means comprises an electronic counter coupled to said oscillation detector for counting the output signals therefrom and generating binary-coded signals in response thereto, and electronic converting means coupled to said electronic counter and to said counting means outputs and responsive to said binary-coded signals for converting same to decimal signals at said outputs.

11. The shock absorber tester of claim 1, wherein said oscillation detector comprises an accelerometer having a housing; an actuator having a fixed end and a free end, said fixed end being pivotally secured to said housing; a spring member linking said housing and said free end of said actuator, said spring member establishing a relaxed position for said actuator; and a contact member within said housing, said contact member having a first contact portion and a second contact portion, said free end of said actuator interposing said first contact portion and said second contact portion, said free end being substantially equi-distant from said first contact portion and said second contact portion and defining a gap therebetween in said relaxed position, said free end contacting said first contact portion and said second contact portion in response to the movement of said vehicle to provide said output signals.

12. The shock absorber tester of claim 11, further comprising means responsive to said actuator and said contact member for generating a contact pulse representing engagement of said actuator and said contact member, said counter means being responsive to said generating means to produce said separate output indications to said indicator means.

13. A method for testing shock absorbers in situ on a parked automotive vehicle by detecting vertical movement of a sprung portion of the vehicle with respect to an unsprung portion thereof comprising the steps of: placing an oscillation detector which is responsive to vertical oscillations and provides an output signal for each up and down movement thereof on the sprung portion of the vehicle; coupling the output signals from said oscillation detector to counting means which counts said output signals and produces separate output indications for each counted output signal; energizing an indicator light in response to each of said output indications from said counting means; pushing said vehicle down to displace said sprung portion thereof with respect to the unsprung portion thereof a predetermined amplitude and for a pre-established number of times to activate said oscillation detector, and observing the number of indicator lights energized to thereby determine the number of oscillations required for the sprung portion of the vehicle to return substantially to rest from the initial disturbing displacement thereof for indicating the condition of the shock absorber.

14. The method of claim 13, further comprising the step of pushing said vehicle down five times to activate said oscillation detector.

15. The method of claim 14, further comprising the step of pushing said vehicle down approximately four inches to activate said oscillation detector.

* * * * *